July 31, 1956     J. O. HUTCHINSON ET AL     2,757,284
GATED AMPLIFIER
Filed March 9, 1950
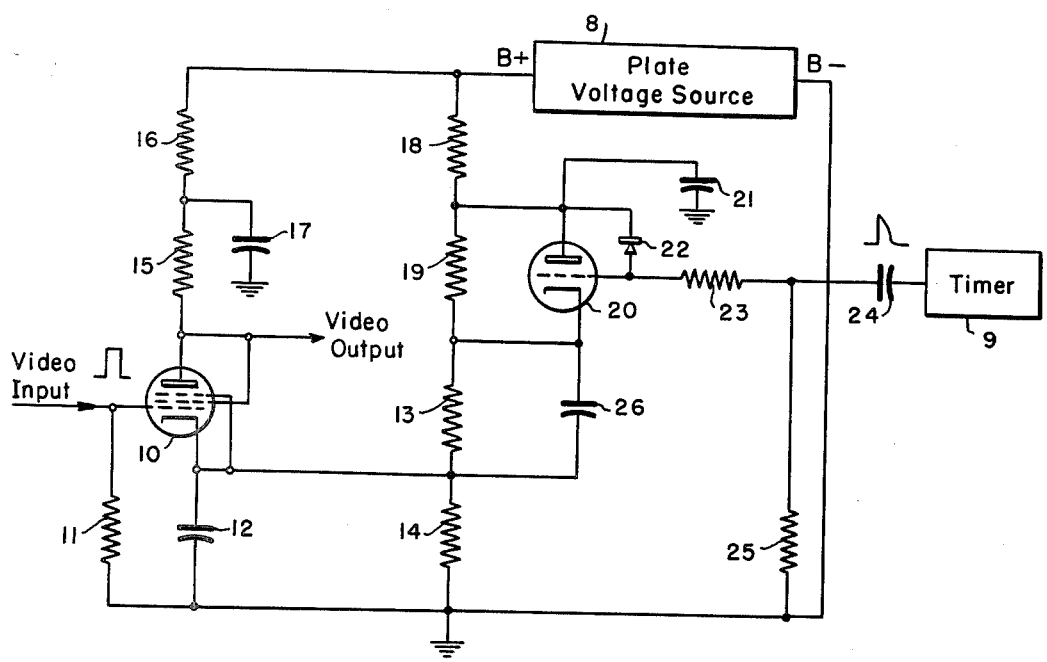
WITNESSES:
INVENTORS
James O. Hutchinson &
John W. Taylor, Jr.
BY
ATTORNEY United States Patent Office 2,757,284
Patented July 31, 1956

2,757,284

GATED AMPLIFIER

James O. Hutchinson, Arbutus, and John W. Taylor, Jr., Baltimore, Md., assignors to Westinghouse Electric Corporation, East Pittsburgh, Pa., a corporation of Pennsylvania Application March 9, 1950, Serial No. 148,708

8 Claims. (Cl. 250—27)

This invention relates to amplifiers, and relates more particularly to video amplifiers for radar receivers.

Sensitivity time control circuits are used in pulse radar systems of the type in which a series of pulses are transmitted at a specific repetition rate, and reflected echo pulses are received at times after transmission, depending upon the range of the target. As the range is increased, the reflected signals at the receiver will be attenuated, and since maximum gain in the receiver is required, it has been the practice to increase the gain of the intermediate frequency amplifier of such a receiver between transmitted pulses.

This invention provides a sensitivity time control circuit in which the sensitivity of a high gain, video amplfier stage is reduced on a time basis. It may be used for reducing the gain at the time of the transmitted pulses, or for desensitizing a receiver of a system with two decoupled antennas, by rendering the receiver insensitive to the coupled pulse, thus permitting the system to receive while transmitting.

An object of this invention is to decrease the gain of an amplifier on a time basis.

Another object of this invention is to reduce the gain of a video amplifier in a radar receiver when pulses are transmitted by the associated radar transmitter.

Another object of this invention is to desensitize a radar receiver at such times as the associated transmitter is sending out pulses.

The invention will now be described with reference to the drawing which is a circuit schematic of a video amplifier stage embodying this invention.

Referring now to the drawing, the high gain, video amplifier, pentode tube 10 has its control grid connected to a source of video signals, which may be a preceding amplifier tube in a video amplifier, and through the grid resistor 11 to ground. The cathode of the tube is connected through the capacitor 12 to ground, and to the junction point of the series-connected resistors 13 and 14. The plate of the tube is connected through the series-connected resistors 15 and 16 to a positive terminal of a conventional plate voltage source 8. The by-pass capacitor 17 is connected to the junction point of the resistors 15 and 16 to ground. The screen grid of the tube is connected to its plate, and its suppressor grid is connected to its cathode.

The series-connected resistors 18 and 19 are connected to a positive terminal of the plate voltage source and to the resistor 13 whereby the resistors 18, 19, 13 and 14 are connected in series across the plate voltage source 8, the negative terminal of which is grounded.

The junction point of the resistors 18 and 19 is connected to the plate of the control tube 20. The plate of the tube 20 is also connected through the by-pass capacitor 21 to ground, and through the crystal rectifier 22 to the control grid of the tube 20. The control grid of the tube 20 is also connected through the series-connected resistor 23 and capacitor 24, to a conventional timer 9 which supplies positive trigger pulses to the control grid of the tube 20. The junction point of the resistor 23 and the capacitor 24 is connected through the grid resistor 25 to ground. The cathode of the tube 20 is connected to the junction point of the resistors 13 and 19, and is connected through the by-pass capacitor 26 to the junction point of the resistors 13 and 14.

In the steady state, the tube 20 is maintained cut-off and the tube 10 near cut-off by the voltage divider consisting of the resistors 19, 13 and 14.

In operation, coincident with, or just before the associated radar pulse transmitter is fired, the timer connected to the grid of the tube 20 supplies a positive pulse to such grid causing the tube 20 to conduct. The resistor 19 is selected to have a value of about 100,000 ohms. When the tube 20 conducts it has a plate resistance of about 6,000 ohms which causes a change in the current in the voltage divider. Instantaneously, the voltage across the resistor 14 increases and the capacitor 12 is charged to this new value. The control pulse on the grid of the tube 20 is very narrow so that the tube shortly becomes cut-off again. The voltage across the resistor 14 then decays exponentially to the steady state value at a rate dependent upon the time constant of the resistor 14 and the capacitor 12.

The resistor 14 thus provides a fast rising and an exponentially falling control gate voltage to the cathode of the amplifier tube 10 which, when a control pulse is applied, forces it below cut-off to such a point that all positive input pulses below a certain level applied to its control grid, are not passed, and pulses above that level are amplified to a less extent than in a conventional video amplifier. Between control pulses the voltage on the cathode of the tube 10 decreases so that its gain is increased to normal.

Since the control pulses are applied at the times large signal inputs are expected, the dynamic range of the receiver is greatly increased.

Since the tube 10 is normally operated near cut-off the control pulses take it below cut-off so that they do not appear in its output.

The crystal 22 connected between the grid and plate of the control tube 20 prevents this grid from becoming more positive than the plate. By using a large trigger pulse, clipped off by the crystal 22, the circuit is made relatively insensitive to variations in trigger amplitude. The capacitor 21 absorbs the clipped portion of the trigger pulse, and the capacitor 26 shunts the desired signal around the resistor 13 to charge the capacitor 12 rapidly. The capacitor 26 is, therefore, made large compared to capacitor 12.

The components of this circuit can be so selected that a wide range of gain-time characteristics can be provided, and so that the dynamic range of a high gain video amplifier can be greatly extended. As a result, design problems are simplified since this one circuit is flexible enough to meet a wide range of operating conditions.

We claim as our invention:

1. An amplifier comprising an amplifier tube having a cathode, a control tube having a control electrode, a cathode and an anode, a direct current supply source, bias means comprising separate voltage dividing resistors connected in series across said source, one of said resistors being connected to said amplifier tube cathode, another of said resistors being connected between said amplifier tube and control tube cathodes, and another of said resistors being connected between said control tube anode and cathode, said bias means normally biasing said control tube below cut-off and said amplifier tube just above cut-off, and means for periodically charging said control electrode of said control tube to such a potential that said control tube conducts, whereby the resulting current flow through said last mentioned resistor causes said bias means to bias said amplifier tube below cut-off.

2. An amplifier as claimed in claim 1 in which a rectifier is connected between said control electrode and anode of said control tube.

3. An amplifier comprising an amplifier tube having a control grid, a cathode and an anode, a control tube having a control grid, a cathode and an anode, a direct current source, a load resistor connecting said amplifier tube anode to said source, bias means comprising a plurality of separate resistors connected in series across said source, one of said resistors being connected to said amplifier tube cathode and the negative terminal of said source, a second of said resistors being connected to said one resistor and to said control tube cathode, a third of said resistors being connected between said control tube cathode and anode, and a fourth of said resistors being connected to said control tube anode and a positive terminal of said source, grid resistors connecting said amplifier and control tube grids to said negative terminal of said source, said bias means normally biasing said amplifier tube cathode to such a negative potential with respect to said amplifier tube grid, that said amplifier tube normally operates just above cut-off, and biasing said control tube cathode to such a negative potential with respect to said control tube grid that said control tube operates normally below cut-off, and means for periodically charging said control tube grid to such a positive potential that said control tube conducts and causes such a current charge in said third resistor that said bias means charges said amplifier tube cathode to such a potential with respect to said amplifier tube grid that said amplifier tube operates below cut-off.

4. An amplifier as claimed in claim 3 in which a capacitor is connected across said one resistor.

5. An amplifier as claimed in claim 3 in which a rectifier is connected between the control tube grid and anode.

6. An amplifier as claimed in claim 5 in which a capacitor is connected across said one resistor.

7. An amplifier comprising an amplifier tube having a control electrode and a cathode, means for applying an input signal to said control electrode, means for controlling conduction through said amplifier tube and including a voltage divider and a normally non-conductive control tube in parallel with a portion of said voltage divider, a cathode and a control electrode for said control tube, a capacitor in parallel with a portion of said voltage divider directly coupling the cathode of said amplifier tube to the cathode of said control tube, and means for periodically applying a potential to the control electrode of said control tube.

8. An amplifier comprising an amplifier tube having a control electrode and a cathode, means for applying an input signal to said control electrode, a source of anode voltage for said amplifier tube, a voltage divider connected between the positive and negative terminals of said voltage source, a control tube connected in parallel with a first portion of said voltage divider, a control electrode and a cathode for said control tube, a capacitor connected in parallel with a second portion of said voltage divider, said capacitor also being connected directly between the cathodes of said amplifier and control tubes respectively, and means for periodically applying a potential to the control electrode of said control tube.

References Cited in the file of this patent
UNITED STATES PATENTS

| | | |
|---|---|---|
| 2,179,974 | Beers | Nov. 14, 1939 |
| 2,300,999 | Williams | Nov. 3, 1942 |
| 2,371,988 | Granqvist | Mar. 20, 1945 |
| 2,427,523 | Dolberg et al. | Sept. 16, 1947 |
| 2,451,632 | Oliver | Oct. 19, 1948 |
| 2,535,912 | Frank et al. | Dec. 26, 1950 |
| 2,596,138 | Feiner et al. | May 13, 1952 |